US008297848B2

(12) United States Patent
Nakajima et al.

(10) Patent No.: US 8,297,848 B2
(45) Date of Patent: Oct. 30, 2012

(54) MAGNETIC ENCODER AND ROLLING BEARING

(75) Inventors: Tatsuo Nakajima, Iwata (JP); Arito Matsui, Iwata (JP)

(73) Assignee: NTN Corporation, Osaka (JP)

( * ) Notice: Subject to any disclaimer, the term of this patent is extended or adjusted under 35 U.S.C. 154(b) by 229 days.

(21) Appl. No.: 12/679,103

(22) PCT Filed: Sep. 1, 2008

(86) PCT No.: PCT/JP2008/065673
§ 371 (c)(1),
(2), (4) Date: Mar. 19, 2010

(87) PCT Pub. No.: WO2009/037963
PCT Pub. Date: Mar. 26, 2009

(65) Prior Publication Data
US 2010/0239201 A1   Sep. 23, 2010

(30) Foreign Application Priority Data

Sep. 21, 2007   (JP) .................................. 2007-245209

(51) Int. Cl.
*F16C 32/04* (2006.01)
*F16C 19/08* (2006.01)
*G01P 3/44* (2006.01)

(52) U.S. Cl. ... 384/448; 384/446; 384/548; 324/207.25; 324/173

(58) Field of Classification Search .................. 384/448, 384/446, 478, 482, 486, 544, 548, 562; 277/549, 277/562, 571, 572; 324/173–174, 207.25
See application file for complete search history.

(56) References Cited

U.S. PATENT DOCUMENTS

| | | | | |
|---|---|---|---|---|
| 6,637,754 B1 * | 10/2003 | Ohtsuki et al. | ................ | 277/549 |
| 6,789,948 B2 * | 9/2004 | Nakajima | ..................... | 324/174 |
| 6,939,050 B2 * | 9/2005 | Ohtsuki et al. | ................ | 384/448 |
| 6,979,001 B2 * | 12/2005 | Ohtsuki et al. | ................ | 384/478 |
| 7,800,361 B2 * | 9/2010 | Tomioka | .................. | 324/207.25 |
| 2005/0007226 A1 * | 1/2005 | Mizuta | .......................... | 335/207 |
| 2005/0058376 A1 * | 3/2005 | Oohira et al. | ................. | 384/448 |
| 2005/0259902 A1 * | 11/2005 | Ohtsuki et al. | ................ | 384/448 |

FOREIGN PATENT DOCUMENTS

| | | | |
|---|---|---|---|
| JP | 63295691 A | * | 12/1998 |
| JP | 2000017247 A | * | 1/2000 |
| JP | 2002-062305 | | 2/2002 |
| JP | 2002-213620 | | 7/2002 |
| JP | 2003-083345 | | 3/2003 |
| JP | 2004-019827 | | 1/2004 |
| JP | 2004-332938 | | 11/2004 |
| JP | 2005-321307 | | 11/2005 |
| JP | 2006047268 A | * | 2/2006 |
| JP | 2006177756 A | * | 7/2006 |
| JP | 2006214920 A | * | 8/2006 |
| JP | 2007057480 A | * | 3/2007 |
| JP | 2007107911 A | * | 4/2007 |
| JP | 2007-205770 | | 8/2007 |

* cited by examiner

*Primary Examiner* — Marcus Charles
(74) *Attorney, Agent, or Firm* — Clark & Brody

(57) ABSTRACT

The magnetic encoder (17) includes a slinger (18) fixed to a rotation-side raceway ring of a bearing and including an outer side surface (22) opposed to the side of a sensor to detect rotation speed of the rotation-side raceway ring and having a surface roughness Ra: 0.3 to 3.0 μm, and an inner side surface (23) opposed to the side of a sealing member (16) to seal the bearing; a multipolar magnet (19) bonded to the outer side surface (22) through an adhesive; and a film (25b) formed on the inner side surface (23), having a surface roughness Ra of 0.3 μm or less, and being in sliding contact with the sealing member (16).

6 Claims, 2 Drawing Sheets

PRIOR ART

MAGNETIC ENCODER AND ROLLING BEARING

CROSS REFERENCE TO RELATED APPLICATIONS

This is a 371 National Stage application based on PCT/JP2008/065673, filed on Sep. 1, 2008, which is based on Japanese application no. 2007-245209, filed on Sep. 21, 2007.

TECHNICAL FIELD

The present invention relates to a magnetic encoder and a rolling bearing and more particularly, to a magnetic encoder provided in a rolling bearing to support a rotation shaft, and a rolling bearing including such magnetic encoder.

BACKGROUND ART

Conventionally, bearings used in an ABS (Antilock Brake System) of a car include a rolling bearing with a sealing member, equipped with a magnetic encoder. Such rolling bearing is disclosed in Japanese Unexamined Patent Publication No. 2002-62305, and Japanese Unexamined Patent Publication No. 2004-19827.

A brief description will be made of a basic configuration of the conventional rolling bearing disclosed in the Japanese Unexamined Patent Publication No. 2002-62305, and Japanese Unexamined Patent Publication No. 2004-19827. FIG. 4 is a cross-sectional view showing a part of a conventional rolling bearing 101. Referring to FIG. 4, the rolling bearing 101 includes an outer ring 102, an inner ring 103, a ball 104 arranged between the outer ring 102 and the inner ring 103, a retainer 105 retaining the ball 104, a sealing member 106 fixed to the outer ring 102, and a magnetic encoder 107 fixed to the inner ring 103.

The magnetic encoder 107 includes a metal slinger 108 fixed to the inner ring 103, and a rubber multipolar magnet 109 mounted on an outer side surface 110 of the slinger 108. The slinger 108 and the multipolar magnet 109 are bonded and retained by an adhesive. A rotation sensor 112 provided outside the rolling bearing 101 detects a magnetic pole of the multipolar magnet 109 fixed to the inner ring 103 which rotates with a rotation shaft (not shown) to detect rotation speed of the rotation shaft.

In addition, the sealing member 106 is in sliding contact with the slinger 108 and seals the inside of the rolling bearing 101 to prevent grease sealed in the rolling bearing 101 from leaking and a foreign material from entering the rolling bearing 101.

Here, it is preferable that the multipolar magnet 109 is firmly bonded to the slinger 108 because when the bonding force between the slinger 108 and the multipolar magnet 109 is weak, the multipolar magnet 109 could come off in a short period. In this case, the outer side surface 110 of the slinger 108 to which the multipolar magnet 109 is bonded can increase in bonding force when its surface is roughened. In addition, when the multipolar magnet 109 is retained by use of baking, the surface is also preferably roughened. Meanwhile, as for the sealing member 106, it is preferable to enhance its sealing performance. In this case, the sealing performance is improved by smoothing an inner side surface 111 of the slinger 108 which is in sliding contact with the sealing member 106.

Here, the Japanese Unexamined Patent Publication No. 2002-62305 discloses a technique to differentiate surface roughness of the surface to which the multipolar magnet is bonded, from that of the surface which is in sliding contact with the sealing member by setting surface roughness of the outer side surface of the slinger to approximately Ra: 1.0 to 1.5 μm and the surface roughness of the inner side surface of the slinger to approximately Ra: 0.3 μm. Here, Ra means arithmetic mean roughness. However, in the above case, since a polishing process to differentiate the surface roughness of the slinger is needed, the cost could increase. In addition, the slinger could be deformed when the sliding surface is polished.

The Japanese Unexamined Patent Publication No. 2004-19827 discloses a technique in which the outer side surface and the inner side surface have the same surface roughness such that the surface roughness of the entire surface of the slinger is Ra: 0.3 to 0.9 μm. However, when they have the same roughness, the surface to which the multipolar magnet is bonded and the surface being in sliding contact with the sealing member do not function well in some cases.

DISCLOSURE OF THE INVENTION

It is an object of the present invention to provide a magnetic encoder which prevents a magnet from coming off and enhances sealing performance of a sealing member.

It is another object of the present invention to provide a rolling bearing having a long life time.

A magnetic encoder includes a slinger fixed to a rotation-side raceway ring of a bearing and including an outer side surface opposed to the side of a sensor to detect rotation speed of the rotation-side raceway ring and having surface roughness Ra: 0.3 to 3.0 μm, and an inner side surface opposed to a sealing member to seal the bearing, a magnet bonded to the outer side surface through an adhesive, and a film formed on the inner side surface, having surface roughness Ra: 0.3 μm or less, and being in sliding contact with the sealing member.

Thus, since the surface roughness of the outer side surface of the slinger is set to Ra: 0.3 to 3.0 μm, the magnet can be firmly bonded and retained by the slinger through the adhesive. In addition, since the film having the surface roughness Ra: 0.3 μm or less is formed on the inner side surface of the slinger, the smoothness of the sliding surface with the sealing member can be ensured. Furthermore, this film can be easily formed on the inner side surface of the slinger. Therefore, the magnet can be prevented from coming off, while the sealing performance of the sealing member being in sliding contact with the slinger can be enhanced.

Preferably, the film is made of the same material as the adhesive, and the adhesive is continuously applied to the outer side surface and the inner side surface.

Thus, the film can be easily formed by applying the adhesive on the inner side surface in the same process as that for applying the adhesive on the outer side surface. In this case, since the film is formed of the same as the adhesive, the material cost can decrease. In addition, since the adhesive is continuously applied to the outer side surface and the inner side surface, the adhesive can be easily applied. As a result, the productivity of the magnetic encoder can be enhanced.

Further preferably, the magnet includes a multipolar magnet composed of magnetic powder and rubber to bind the magnetic powder and having magnetic poles arranged alternately in a circumferential direction, and the adhesive includes a vulcanization adhesive.

Further preferably, the rubber includes nitrile rubber.

When the magnetic encoder according to the present invention is used to detect rotation speed of a wheel axle of a car, for example, oil resistance required in this usage can be improved.

Further preferably, the vulcanization adhesive includes a phenolic resin vulcanization adhesive.

In this case, the rubber multipolar magnet can be further prevented from coming off.

According to another aspect of the present invention, a rolling bearing includes a rotation-side raceway ring, a static-side raceway ring, a rolling body arranged between the rotation-side raceway ring and the static-side raceway ring, and rolling on a track surface of the rotation-side raceway ring and a track surface of the static-side raceway ring, a magnetic encoder fixed to the rotation-side raceway ring, and a sealing member fixed to the static-side raceway ring. The magnetic encoder includes a slinger fixed to the rotation-side raceway ring and including an outer side surface opposed to the side of a sensor to detect rotation speed of the rotation-side raceway ring and having surface roughness Ra: 0.3 to 3.0 µm, and an inner side surface opposed to the side of the sealing member to seal the rolling bearing, a magnet bonded to the outer side surface through an adhesive, and a film formed on the inner side surface, having surface roughness Ra: 0.3 µm or less, and being in sliding contact with the sealing member.

In this rolling bearing, since the magnet is prevented from coming off and the sealing performance of the sealing member is high, the rolling bearing can be used for a long period of time.

Consequently, according to the present invention, since the surface roughness of the outer side surface of the slinger is set to Ra: 0.3 to 3.0 µm, the magnet can be firmly bonded and retained by the slinger through the adhesive. In addition, since the film having the surface roughness Ra: 0.3 µm or less is formed on the inner side surface of the slinger, the smoothness of the sliding surface with the sealing member can be ensured. Furthermore, this film can be easily formed on the inner side surface of the slinger. Therefore, the magnet can be prevented from coming off, while the sealing performance of the sealing member being in sliding contact with the slinger can be enhanced.

In addition, in the rolling bearing according to the present invention, since the magnet is prevented from coming off and the sealing performance of the sealing member is high, the rolling bearing can be used for a long period of time.

BEST MODE FOR CARRYING OUT THE INVENTION

Figure 1:
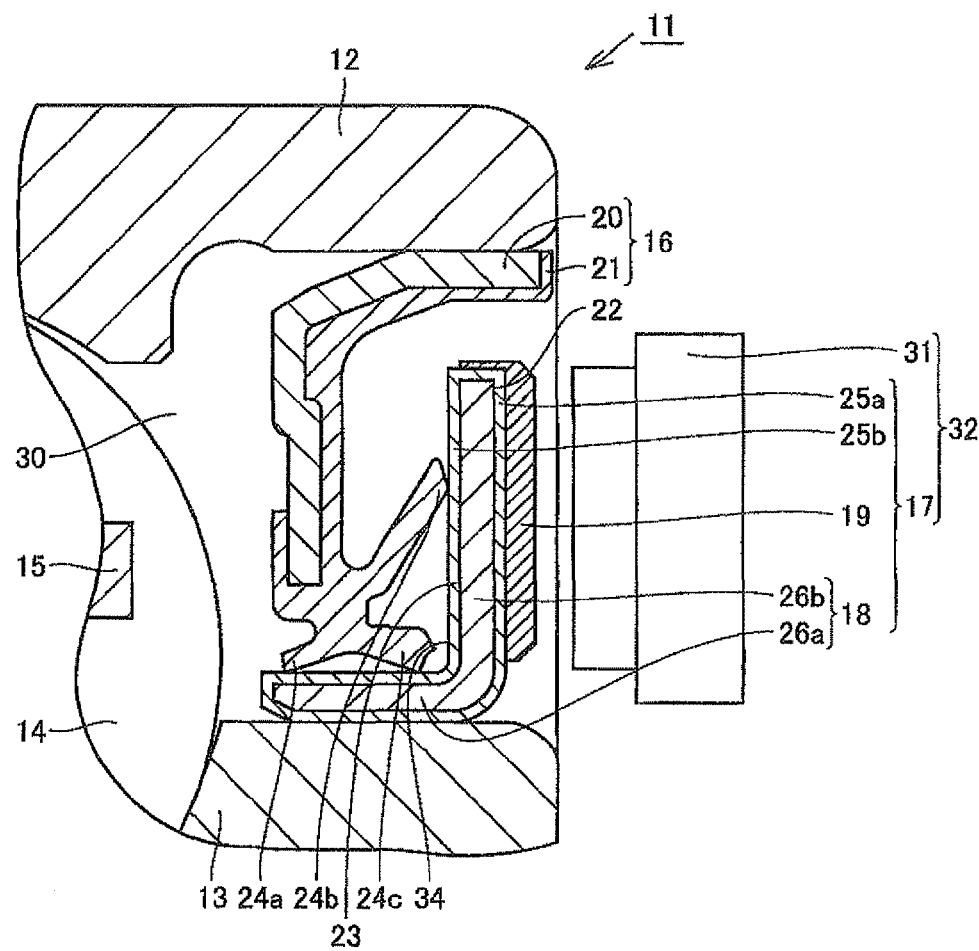
FIG. 1 is a cross-sectional view showing a part of a rolling bearing according to one embodiment of the present invention.

Hereinafter, an embodiment of the present invention will be described with reference of the drawings. FIG. 1 is a cross-sectional view showing a part of a rolling bearing 11 according to one embodiment of the present invention. Referring to FIG. 1, the rolling bearing 11 supports a rotation shaft (not shown). The rolling bearing 11 includes a ball 14 as a rolling body, an inner ring 13 fixed to the rotation shaft and arranged on the inner diameter side of the ball 14, an outer ring 12 fixed to a housing (not shown) and arranged on the outer diameter side of the ball 14, a retainer 15 retaining the ball 14, a magnetic encoder 17 to detect rotation speed of the rotation shaft, and a sealing member 16 to seal an inside 30 of the rolling bearing 11. The ball 14 is arranged between the inner ring 13 and the outer ring 12, and rolls on track surfaces provided in the inner ring 13 and the outer ring 12.

The sealing member 16 has a rigid cored bar 20 and an elastic rubber part 21. The cored bar 20 is mounted on the outer ring 12 and fixed thereto. The rubber part 21 is configured to cover a part of the cored bar 20. The sealing member 16 has a plurality of lip parts 24a, 24b, and 24c projecting toward the inner diameter side and bearing outer side. The lip parts 24a, 24b, 24c are in sliding contact with a slinger 18 to be described below at an appropriate pressure. Thus, the sealing member 16 seals the inside 30 of the rolling bearing 11 to prevent sealed grease from leaking and a foreign material from entering the inside 30 of the rolling bearing 11.

The rotation speed of the rotation shaft supported by the rolling bearing 11 is detected by a rotation detection device 32. The rotation detection device 32 includes the magnetic encoder 17 provided in the rolling bearing 11, and a rotation sensor 31. The rotation sensor 31 is mounted on a position outside the rolling bearing 11 and opposed to the magnetic encoder 17. The rotation sensor 31 is mounted on the housing and fixed thereto, for example. The rotation sensor 31 detects the rotation speed of the rotation shaft by detecting the rotation speed of the magnetic encoder 17.

Figure 2:
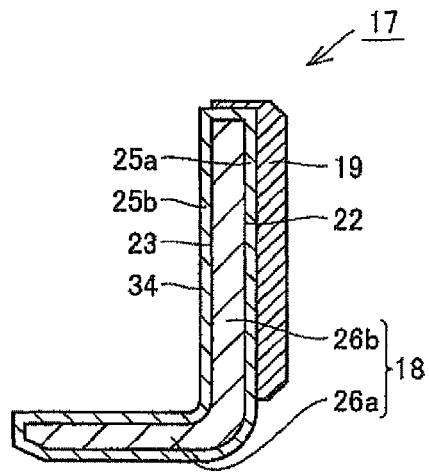
FIG. 2 is a cross-sectional view showing a part of a magnetic encoder according to one embodiment of the present invention.
Figure 3:
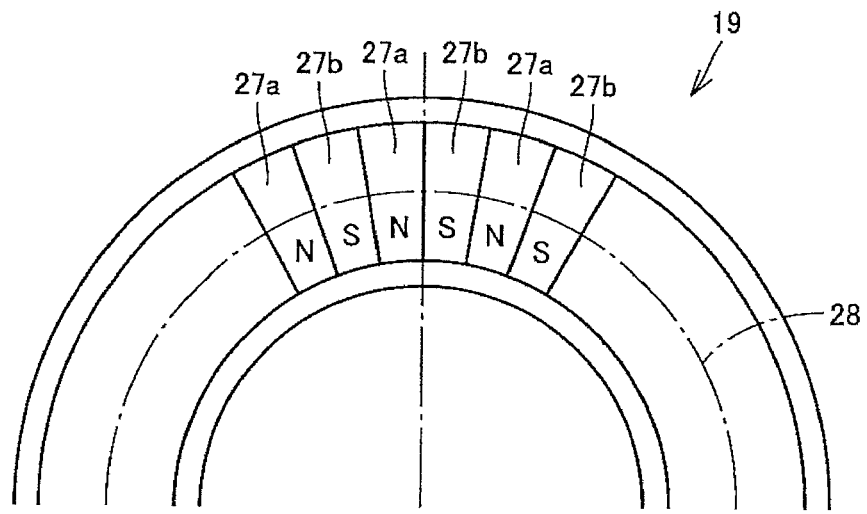
FIG. 3 is a conceptual diagram showing a multipolar magnet included in the magnetic encoder.
Figure 4:
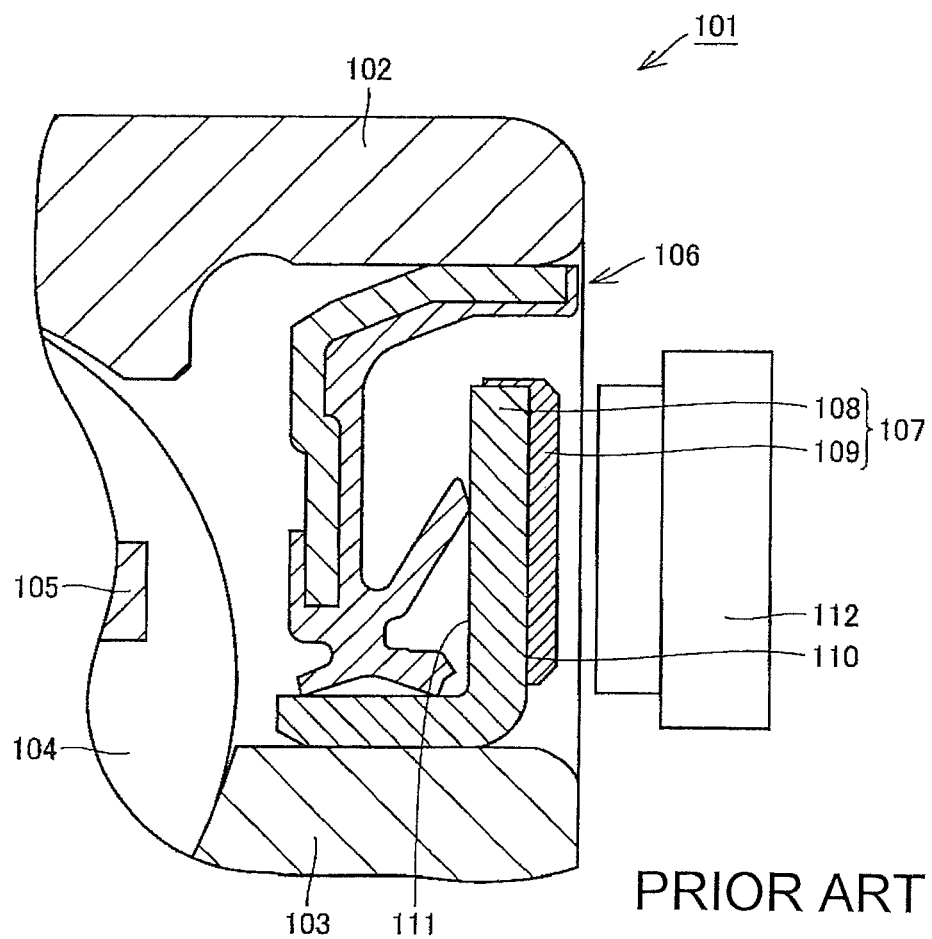
FIG. 4 is a cross-sectional view showing a part of a conventional rolling bearing.

Hereinafter, a description will be made of the magnetic encoder 17 provided in the rolling bearing 11. FIG. 2 is a cross-sectional view showing a part of the magnetic encoder 17 according to one embodiment of the present invention. FIG. 3 is a conceptual diagram showing a multipolar magnet 19 included in the magnetic encoder 17. With a view to easy understanding, thickness of an adhesive applied on the surface of the slinger and a thickness of a film formed thereon are exaggerated thickly in FIGS. 1 and 2. Referring to FIGS. 1 to 3, the magnetic encoder 17 includes the multipolar magnet 19 magnetized multipolarly in a circumferential direction, and the slinger 18 to hold the multipolar magnet 19.

First, the configuration of the multipolar magnet 19 will be described. The multipolar magnet 19 is in the form of a ring, and a through hole is provided in its center. The multipolar magnet 19 is configured to arrange N poles 27a and S poles 27b alternately, on a PCD (Pitch Circle Diameter) 28. The multipolar magnet 19 is made of a rubber material composed of magnetic powder and rubber to bind the magnetic powder.

Hard ferrite such as strontium ferrite and barium ferrite, and soft ferrite may be used for the magnetic powder. The ferrite powder may be granular powder or may be pulverized powder made of anisotropic ferritic core.

Alternatively, the magnetic powder may be made of a rare-earth magnetic material. In this case, it may be any one of Sm—Fe—N magnetic powder as the rare-earth magnetic material, Nd—Fe—B magnetic powder as the rare-earth magnetic material, and samarium-cobalt powder, or may be mixed powder of the two or more kinds of the above rare-earth magnetic powder.

Furthermore, when sufficient magnetic force is not provided by ferrite alone, the Sm—Fe—N magnetic powder or Nd—Fe—B magnetic powder as the rare-earth magnetic material may be added to the ferrite powder by a required amount. In this case, the powder can be produced at low cost, while the magnetic force is improved.

The rubber to bind the magnetic powder may be natural rubber, polyisobutylene, polyisoprene, isoprene-isobutylene rubber (butyl rubber), styrene-butadiene rubber, styrene-isobutylene-styrene rubber (SBS), styrene-isoprene-styrene rubber (SIS), styrene-ethylene-butylene-styrene rubber (SEBS), ethylene-propylene terpolymer (EPDM), acrylonitrile-butadiene rubber (NBR), hydrogenated NBR (H-NBR), fluorine rubber, silicon rubber, acrylic rubber, chloroprene rubber, chlorosulfonated polyethylene, epichlorohydrin rubber, urethane rubber, and polysulfide rubber. Especially, the nitrile rubber such as acrylonitrile-butadiene rubber (NBR) and hydrogenated NBR (H-NBR) can improve oil resistance when the magnetic encoder 17 is used in a car and the like.

Next, a description will be made of the configuration of the slinger 18 to hold the multipolar magnet 19. The slinger 18 has a cylindrical part 26a, and a flange 26b extending from one end of the cylindrical part 26a on the side of the rotation sensor 31 toward the radial outer side. The cross-section of the slinger 18 is in the form of roughly an L shape. The slinger 18 is fixed to the inner ring 13 by pressing the inner ring 13 in the cylindrical part 26a. The slinger 18 comprises an outer side surface 22 opposed to the bearing outer side, that is, the side of the rotation sensor 31, and an inner side surface 23 opposed to the bearing inner side, that is, the side of the sealing member 16. The outer side surface 22 is provided in the flange 26b and opposed to the rotation sensor 31, and the inner side surface 23 is provided in both the cylindrical part 26a and the flange 26b and opposed to the side of the sealing member 16. In addition, the slinger 18 is made of metal and its surface roughness is Ra: 0.3 to 3.0 μm. That is, the surface roughness of the outer side surface 22 is also Ra: 0.3 to 3.0 μm. The multipolar magnet 19 is retained by being bonded to the outer side surface 22 of the slinger 18 through the adhesive.

Next, a brief description will be made of a method of producing the magnetic encoder 17 including the slinger 18 and the multipolar magnet 19. First, as a magnetic field forming device, a mold part to shape a cavity as an outer shape of the magnetic encoder 17, and a coil to generate the magnetic field in the cavity in an axial direction are prepared. The mold part is composed of a mold arranged in the axial direction of the cavity and made of a magnetic material, and a mold arranged on each of the inner diameter side and outer diameter side of the cavity and made of a non-magnetic material. Thus, the axial magnetic field generated by the coil can be converted on the cavity part and the magnetic powder can be efficiently oriented in the axial direction.

After such magnetic field forming device has been prepared, the slinger 18 having the above configuration is disposed in the cavity. In this case, a phenolic resin vulcanization adhesive 25a to bond the rubber material of the multipolar magnet 19 is previously applied to the entire surface of the slinger 18. Thus, the above rubber material is inserted into the cavity, while the axial magnetic field is generated by the coil in the cavity. Then, the rubber material is heated and compressed, so that vulcanization bonding is provided between the outer side surface 22 of the slinger 18 and the rubber material thorough the adhesive. At this time, the adhesive applied to the inner side surface 23 of the slinger 18 forms a film 25b. Here, when the surface roughness of the slinger 18 is smaller than Ra: 3.0 μm, a surface roughness of a surface 34 of the film 25b formed of the adhesive applied on the surface of the slinger 18 is Ra: 0.3 μm or less. Then, the rubber material bonded to the slinger 18 is magnetized by a magnetizing yoke and becomes the multipolar magnet 19, whereby the desired magnetic encoder 17 is provided.

More specifically, the magnetic encoder 17 is composed of the slinger 18 including the outer side surface 22 having the surface roughness Ra: 0.3 to 3.0 μm and the inner side surface 23, the multipolar magnet 19 bonded to the outer side surface 22 through the adhesive, and the film 25b formed on the inner side surface 23, having the surface roughness Ra: 0.3 μm or less, and being in sliding contact with the sealing member 16.

As described above, since the surface roughness of the outer side surface 22 of the slinger 18 is Ra: 0.3 to 3.0 μm, the multipolar magnet 19 can be firmly bonded to and retained by the outer side surface 22 through the phenolic resin vulcanization adhesive 25a.

In addition, since the film 25b having the surface 34 whose surface roughness is Ra: 0.3 μm or less is formed of the phenolic resin vulcanization adhesive 25a, the surface being sliding contact with the sealing member 16 can be uniformly provided. In this case, since the film 25b is formed of the phenolic resin vulcanization adhesive 25a previously applied to the inner side surface 23 of the slinger 18, the film 25b having the above configuration can be formed on the inner side surface 23 of the slinger 18 without needing a special step, that is, can be formed by applying the adhesive on the inner side surface 23 in the same process for applying the adhesive onto the outer side surface 22 to bond the rubber material. In this case, for example, the adhesive may be applied to the entire surface of the slinger 18 such that the entire surface of the slinger 18 is soaked in the adhesive prepared in large amount in a container, or the adhesive may be applied onto the entire surface of the slinger 18 such that the adhesive is sprayed onto the entire surface of the slinger 18 with a spray.

As a result, the magnetic encoder 17 can prevent the multipolar magnet 19 from coming off and enhance the sealing performance of the sealing member 16.

In addition, in the rolling bearing 11 including such magnetic encoder 17, since the multipolar magnet 19 is prevented from coming off and the sealing performance of the sealing member 16 is high, the rolling bearing 11 can be used over a long period.

In addition, as for adhesive components, the phenolic resin vulcanization adhesive 25a includes adhesives such as a novolac-type phenolic resin, a resol-type phenolic resin, and a mixture of the above phenolic resins. The novolac-type phenolic resin is obtained by reacting phenols with formaldehyde in the presence of acid catalyst such as hydrochloric acid or oxalic acid. The phenols in this case includes phenol, m-cresol, a mixture of m-cresol and p-cresol, bisphenol A, and the like are used. In addition, the resol-type phenolic resin is obtained by reacting bisphenol A with formaldehyde in the presence of basic catalyst such as alkali metals or hydroxide of magnesium.

Furthermore, the phenolic resin adhesive may use Thixon 715 (made by Rohm and Haas Company), Metaloc N10, Metaloc N15, Metaloc N15D, Metaloc N31, Metaloc NT, and Metaloc PA (made by TOYOKAGAKU KENKYUSHO CO., LTD), and Chemlok TS1677-13 (made by LOAD Far East Incorporation).

Furthermore, an adhesive composed of a mixture of a phenolic resin, and an epoxy resin or synthetic rubber may be used. As the adhesive containing the phonolic resin and the epoxy resin, Metaloc XPH-27 (made by TOYOKAGAKU KENKYUSHO CO., LTD) may be used.

In addition, as the adhesive containing the phenolic resin and the synthetic rubber, Metaloc C12, Metaloc N20, Metaloc N20D, Metaloc N23, and Metaloc P (made by TOYOKAGAKU KENKYUSHO CO., LTD) may be used.

Here, the adhesiveness of the multipolar magnet 19 and the sealing performance of the sealing member 16 were evaluated by performing a saltwater electric current test. Table 1 shows components of the multipolar magnet 19 serving as a test specimen. Table 2 shows a test result regarding the relationship between the surface roughness of the outer side surface 22 and the surface roughness of the surface 34 of the film 25b. In addition, in Table 2, "crossed mark" shows that the performance is not sufficient, and "circular mark" shows that the performance is preferable. In the test, an aluminum board was set as the plus pole and a JIS K6256 90° peel test specimen was set as the minus pole, according to JIS Z2371, and a steady electric current of 2 A was applied in 5% salt water at 30° C. for 12 hours, and then the adhesiveness of the multipolar magnet 19 and the sealing performance of the sealing member 16 were evaluated.

TABLE 1

| Components | Component amount, PHR (Per Hundred Rubber) |
|---|---|
| NBR (made by JSR: N230S) | 100 |
| Ferrite magnetic powder (made by TODA KOGYO CORP.: FA600) | 1350 |
| Antioxidant (made by OUCHI SHINKO CHEMICAL INDUSTRIAL CO., LTD.: NocracCD) | 2 |
| Zinc oxide | 3 |
| Stearic acid | 2 |
| Plasticizer | 5 |
| Sulfur | 0.8 |
| Vulcanization accelerator (made by OUCHI SHINKO CHEMICAL INDUSTRIAL CO., LTD.: Nocceler TT) | 2 |
| Vulcanization accelerator (made by OUCHI SHINKO CHEMICAL INDUSTRIAL CO., LTD.: Nocceler CZ) | 1 |

TABLE 2

|  | Embodiments | | | | | Comparison examples | | | |
|---|---|---|---|---|---|---|---|---|---|
|  | 1 | 2 | 3 | 4 | 5 | 6 | 7 | 8 | 9 |
| Surface roughness of slinger (outer side surface) before vulcanization adhesive is applied (Ra, μm) | 0.3 | 0.5 | 1.0 | 2.0 | 3.0 | 0.05 | 0.1 | 5.0 | 10.0 |
| Adhesiveness of multipolar magnet | ○ | ○ | ○ | ○ | ○ | x | x | ○ | ○ |
| Surface roughness of slinger (inner side surface) after vulcanization adhesive is applied (Ra, μm) | 0.10 | 0.15 | 0.20 | 0.20 | 0.30 | 0.03 | 0.05 | 1.0 | 2.0 |
| Sealing performance with sealing member | ○ | ○ | ○ | ○ | ○ | ○ | ○ | x | x |

Referring to Table 2, as shown in comparison examples 6 and 7, when the surface roughness of the outer side surface 22 of the slinger 18 are Ra: 0.05 μm and 0.1 μm, the adhesiveness of the multipolar magnet 19 is not sufficient. Furthermore, as shown in comparison examples 8 and 9, when the surface roughness of the outer side surface 22 of the slinger 18 are Ra: 5.0 μm and 10.0 μm, the sealing performance of the sealing member 16 is not sufficient. Therefore, when the surfaces roughness of the slinger 18 is set within a range of Ra: 0.3 to 3.0 μm, the multipolar magnet 19 is prevented from coming off and the sealing performance of the sealing member 16 can be enhanced.

In addition, while the phenolic resin vulcanization adhesive 25a is applied to the entire surface of the slinger 18 in the above embodiment, it may be continuously applied only to the outer side surface 22 of the slinger 18 and the inner side surface 23 of the slinger 18.

Furthermore, while the adhesive applied to bond and retain the multipolar magnet 19 and the adhesive applied to form the film 25b are made of the same material in the above embodiment, they may be made of different materials.

In addition, while the film 25b is made of the adhesive in the above embodiment, it may be made of a coating material instead of the adhesive.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention relates to a magnetic encoder and a rolling bearing, and can be effectively applied to a magnetic encoder provided in a rolling bearing to support a rotation shaft and a rolling bearing having such magnetic encoder especially.

The invention claimed is:

1. A magnetic encoder comprising:
    a slinger fixed to a rotation-side raceway ring of a bearing and including an outer side surface opposed to the side of a sensor to detect rotation speed of said rotation-side raceway ring and having surface roughness Ra: 0.3 to 3.0 μm, and an inner side surface opposed to a sealing member to seal said bearing;
    a magnet bonded to said outer side surface through an adhesive; and
    a film formed on said inner side surface, having surface roughness Ra: 0.3 μm or less, and being in sliding contact with said sealing member.

2. The magnetic encoder according to claim 1, wherein said film is made of the same material as said adhesive, and said adhesive is continuously applied to said outer side surface and said inner side surface.

3. The magnetic encoder according to claim 1, wherein said magnet comprises a multipolar magnet composed of magnetic powder and rubber to bind said magnetic powder and having magnetic poles arranged alternately in a circumferential direction, and said adhesive comprises a vulcanization adhesive.

4. The magnetic encoder according to claim 3, wherein said rubber comprises nitrile rubber.

5. The magnetic encoder according to claim 3, wherein said vulcanization adhesive comprises a phenolic resin vulcanization adhesive.

6. A rolling bearing comprising;

a rotation-side raceway ring;

a static-side raceway ring;

a rolling body arranged between said rotation-side raceway ring and said static-side raceway ring, and rolling on a track surface of said rotation-side raceway ring and a track surface of said static-side raceway ring;

a magnetic encoder fixed to said rotation-side raceway ring; and a sealing member fixed to said static-side raceway ring, wherein said magnetic encoder comprises a slinger fixed to said rotation-side raceway ring and including an outer side surface opposed to the side of a sensor to detect rotation speed of said rotation-side raceway ring and having surface roughness Ra: 0.3 to 3.0 μm, and an inner side surface opposed to the side of said sealing member to seal the rolling bearing;

a magnet bonded to said outer side surface through an adhesive; and a film formed on said inner side surface, having surface roughness Ra: 0.3 μm or less, and being in sliding contact with said sealing member.

* * * * *